May 7, 1946. A. J. FORESTIERE, SR 2,399,863
FISHING REEL
Filed Jan. 21, 1944 2 Sheets-Sheet 1
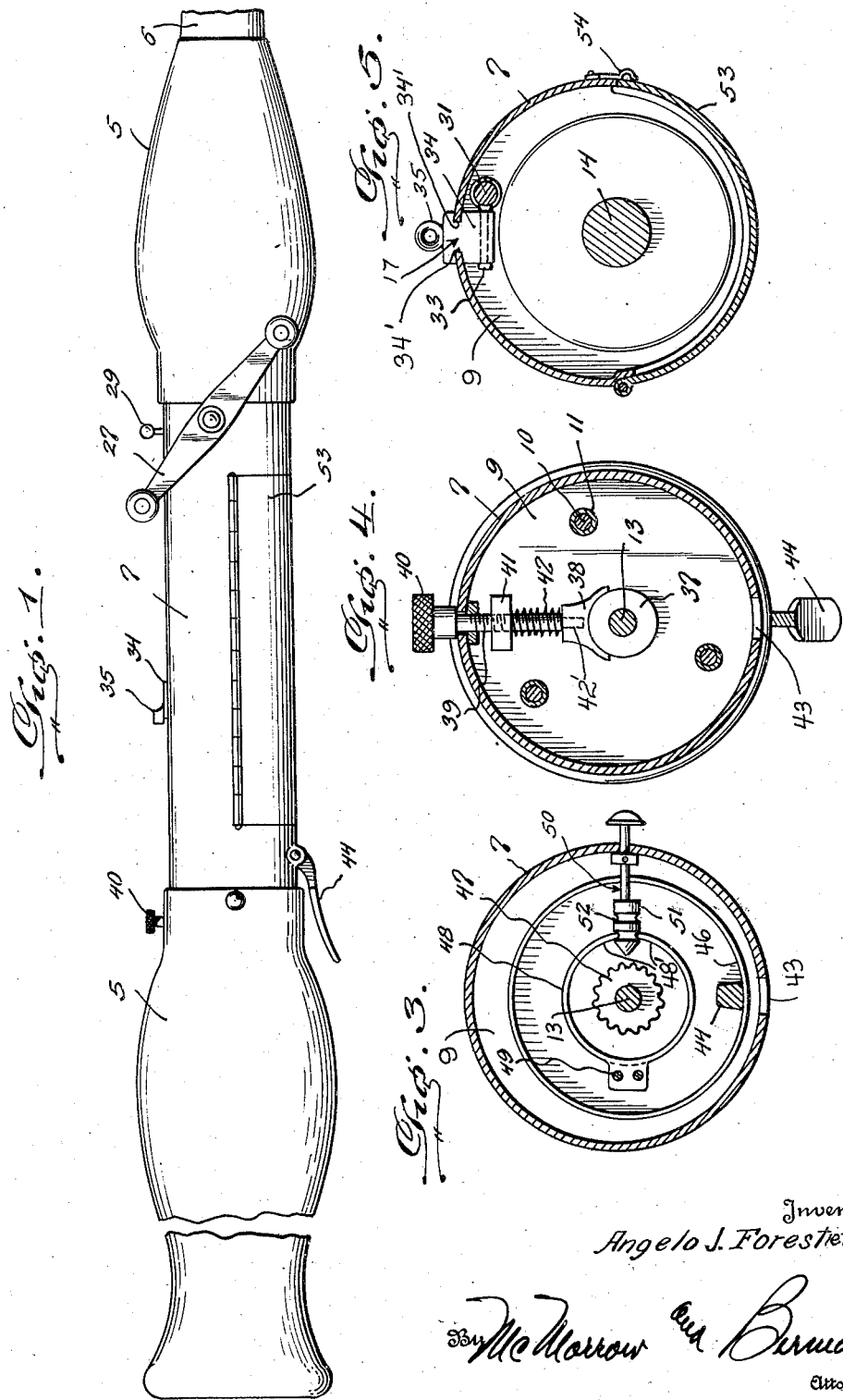
Inventor
Angelo J. Forestiere, Sr.
By McMorrow and Berman
Attorneys

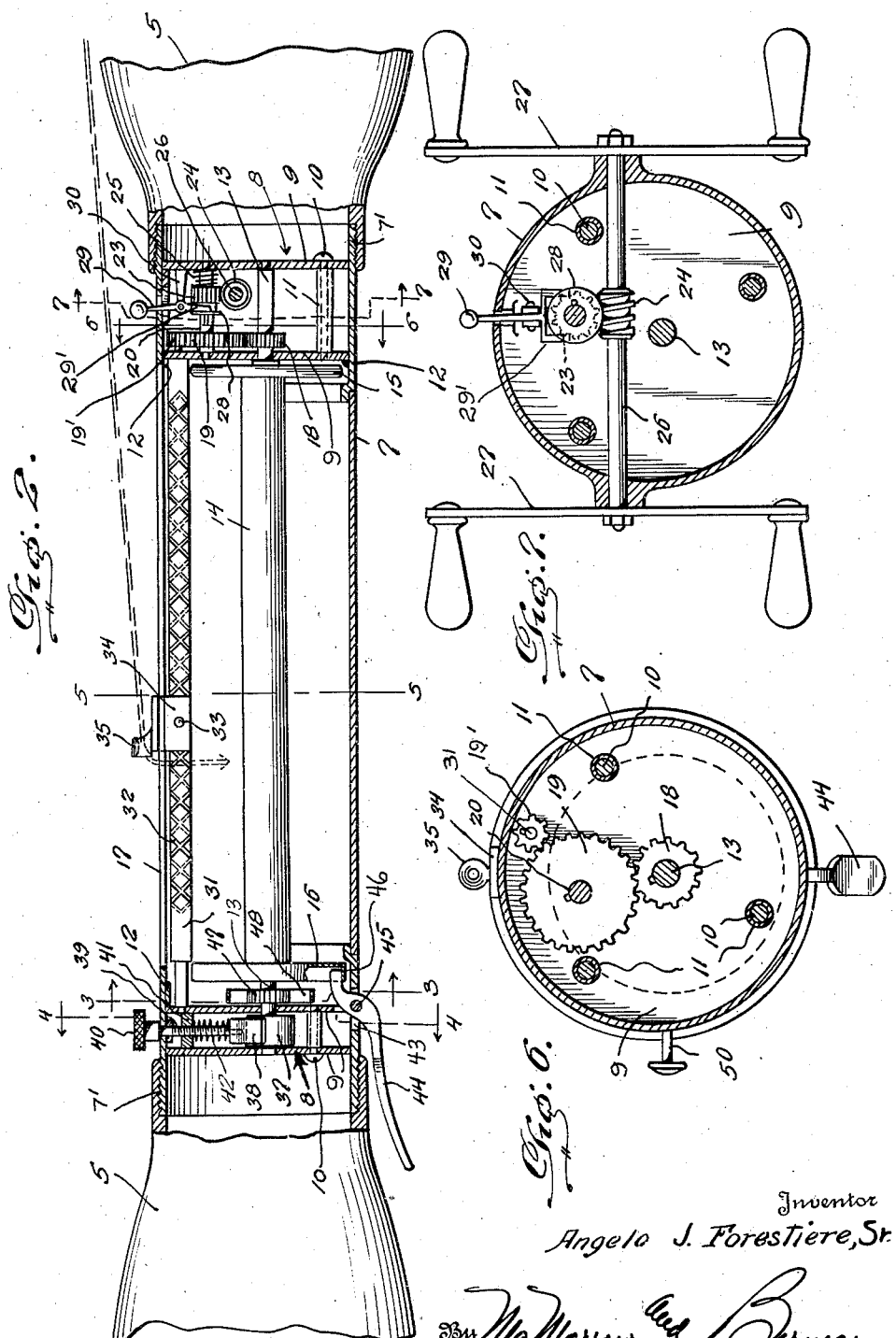

Patented May 7, 1946

2,399,863

UNITED STATES PATENT OFFICE 2,399,863

FISHING REEL

Angelo J. Forestiere, Sr., New Orleans, La.

Application January 21, 1944, Serial No. 519,215

7 Claims. (Cl. 43—20)

This invention relates to a fishing reel, and has for the primary object the provision of a device of this character which is so constructed that it may be readily built in the handle or hand grips of a fishing pole and which may be easily and quickly assembled and disassembled should adjustments or repairs be needed thereto, and includes a conveniently located operating means for the rotation of the line drum thereof from either side of the handle, permitting the fisherman to employ either hand in operating the line drum and a line feed mechanism operated thereby for leveling of the line on the line drum.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a fishing reel and hand grips which cooperate in making up a handle of a fishing pole with the reel constructed in accordance with my invention.

Figure 2 is a fragmentary side elevation, partly in section, showing the reel construction.

Figure 3 is a transverse sectional view taken on the line 3—3 of Figure 2.

Figure 4 is a transverse sectional view taken on the line 4—4 of Figure 2.

Figure 5 is a transverse sectional view taken on the line 5—5 of Figure 2.

Figure 6 is a transverse sectional view taken on the line 6—6 of Figure 2.

Figure 7 is a transverse sectional view taken on the line 7—7 of Figure 2.

Referring in detail to the drawings, the numeral 5 indicates the hand grips which go to make up a part of a handle for a fishing pole and 6 indicates a fragmentary portion of the pole extending from one of the hand grips. In order to complete the handle, the present invention detachably connects the hand grips 5 and provides a rigid connection between the hand grips as well as a reel for the fishing line.

A tubular housing 7 has its ends externally screw threaded as at 7' for threading into the grips 5, providing a firm connection between the grips and one which will permit the grips to be easily removed whenever desired.

Supporting structures 8 are assembled in the tubular housing 7 inwardly from each end thereof and each consists of spaced plates 9 detachably connected together by tie bolts 10 having spacers 11 thereon. The supporting structures 8 when assembled within the tubular housing 7 abut stops 12 near the ends of the housing and have frictional fit with the walls of the housing (see Figure 2). This will permit the supporting structures to be conveniently removed when desired.

The supporting structures 8 rotatably receive pintles 13 of a line drum or reel 14 including the usual head pieces at opposite ends thereof, one of which is a disk 15 having transversely rounded edges and the other is in the form of a brake drum 16. The supporting structures 8 arrange the line drum or reel parallel with a longitudinal line slot 17 formed in a wall portion of the housing 7 through which travels the fishing line when winding on and off of the drum or reel 14 (see Figures 2 and 5).

One of the pintles 13 has keyed thereto a gear 18 which meshes with a gear 19 keyed on a shaft 20 rotatably supported by one of the supporting structures 8 and splined thereon is a spring influenced worm gear 23 meshing with a worm 24. The spring is indicated by the character 25 and acts to normally mesh the worm gear 23 with the worm. The worm 24 forms a part of an operating shaft 26 journaled in bearings provided in opposite walls of the housing 7 and to which operating handles 27 are secured, locating the handles at opposite sides of the housing 7 so that the line reel or drum may be rotated by either hand of the fisherman using the fishing pole.

The worm gear 23 includes a grooved collar 28 engaged by the forked inner end 29' of a lever 29 pivoted on a bracket 30. The lever extends exteriorly of the housing 7 so that the fisherman may interrupt the drive between the handles 27 and the line reel or drum 14 whenever desired. The interruption of the drive will permit the line reel or drum to run free when casting or lowering of the bait into the water.

A feed shaft 31 parallels the line reel or drum 14 and is located adjacent the line slot 17 and is provided with a reversible or endless reversibly angularly crossed feed thread 32. The feed shaft 31 is rotatably carried at its ends by the supporting structures 8 and the thread thereof is engaged by a lateral pin 33 rotatably carried by a block 34 extending through the line slot 17. The block 34 has guide grooves 34' in opposite walls to receive the opposite wall edges of the line slot 17, whereby the block may be caused to slide endwise in opposite directions with respect to both the housing 7 and the line reel or drum by the rotation of the feed shaft 31.

A gear 19' connects the feed shaft 31 with the gear 19. The block 34 carries an eye 35 through which the fishing line extends prior to entering the housing 7 by way of the line slot 17.

Thus it will be seen that during the rotation of either handle 27 by the fisherman the block 34 and its eye 35 moves longitudinally back and forth and acts to feed the fishing line onto the reel or drum 14 from end to end of the latter and thereby brings about leveling of the line on the reel or drum 14.

One of the pintles 13 has secured thereto a brake drum 37 engaged by a brake shoe 38 carried by a screw-threaded adjusting pin 39 extending radially and exteriorly of the housing 7 and provided with a finger piece 40 and the inner end of the pin carrying said brake shoe 38 with longitudinal movement thereon, as at 42'. The adjusting pin 39 is threaded in a block 41 slidable between the adjacent pair of plates 9 of one of the supporting structures and forms a seat for a spring 42 acting on the brake shoe to urge the latter into engagement with the brake drum 37 for retarding the rotation of the reel or drum 14. By varying the tension of the spring the action of the brake shoe on the drum can be varied and thereby vary the braking action on the drum or reel 14. To vary the action of the spring 42, the finger piece is rotated in opposite directions which brings about rotation of the pin 39 and a sliding movement of the block 41 in opposite directions between the plates 9.

Through this arrangement it is possible for the fisherman to regulate the freedom of rotation of the line reel or drum 14.

A finger operated brake lever 44 is pivoted, as shown at 45, in a slot 43 provided in the housing 7 with one end of the lever contacting the inner side of the flange 46 of the drum 16 which as shown partly in section in Figure 2 and in elevation in Figure 3 is an annularly flanged disk. This arrangement will permit the fisherman to increase and decrease the freedom of rotation of the line reel or drum 14 by one finger of the hand grasping one of the hand grips 5 being used to manipulate the lever 44.

A star wheel 47 is secured to the pintle 13 carrying the brake drum 16 and surrounding the same is a split resilient band 48 mounted at its middle position on one of the supporting structures, as shown at 49, the free ends 48' of the band being spaced a limited distance apart. A noise producing element 50 is slidably mounted in the housing 7 and includes a head 51 provided with spaced grooves 52 either of which may receive the ends otherwise free of the split band 48 for holding the head in and out of contact with the star wheel when adjusted and set in engagement with the band at the will of the operator. The head when in contact with the star wheel will produce by the ratchet effect the usual clicking sound common in fishing reels when the line reel or drum thereof is in rotation. This sound can be easily discontinued by the fisherman by disengaging the head 51 from the star wheel by engaging the ends of the band 48 in the innermost groove 52 of the head 51, as shown in Figure 3.

The housing 7 is provided with a hinged door 53 held in a closed position by a catch 54 (see Figure 5). The door 53 when opened will give a comparatively wide entrance to the interior of the housing so that inspection of the line on the line reel or drum can be had as well as to make any adjustments to parts located in this part of the housing.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a fishing device, a tubular housing detachably but rigidly connecting rigid and fixed hand grips spaced longitudinally apart to cooperate therewith in forming a handle for a fishing pole and provided with a longitudinal line slot, a longitudinal drum journaled in said housing to have a line wound thereon and therefrom, a line leveling mechanism supported by and within said housing for feeding the line on and off of the drum, and means for rotating the drum.

2. In a fishing device, a tubular housing detachably but rigidly connecting rigid and fixed longitudinally spaced apart hand grips to cooperate therewith in forming a handle for a fishing pole and provided with a longitudinal elongated line slot, a longitudinal drum journaled in said housing to have a line wound thereon and therefrom, a line leveling mechanism supported by and within said housing for feeding the line on and off of the drum, means for rotating the drum, and a brake mechanism for the drum and operable exteriorly of the housing.

3. In a fishing device, an elongated tubular housing having its ends detachably connecting hand grips to cooperate therewith in completing a handle for a fishing pole and provided with a line slot, a line drum journaled in the housing to receive the line, an operating shaft journaled in the housing and extending through opposite wall portions thereof, crank type handles secured to said shaft, and a gearing mechanism connecting said shaft to the drum and including a manually operated clutch controllable from the exterior of the housing.

4. In a fishing device, an elongated tubular housing having its ends detachably connecting hand grips to cooperate therewith in completing a handle for a fishing pole and provided with a line slot, a line drum journaled in the housing to receive and let out the line, an operating shaft journaled in the housing and extending through opposite walls thereof, crank type handles secured to said shaft, a gearing mechanism connecting said shaft to the drum and including a manually operated clutch controllable from the exterior of the housing, and a variable pressure brake mechanism connected with the drum and operable and adjustable at the will of the operator from the exterior of the housing.

5. In a fishing device, an elongated tubular housing having its ends detachably connecting hand grips to cooperate therewith in completing a handle for a fishing pole and provided with a longitudinally axial line slot, a line drum journaled in the housing to receive and let out the line, a transverse operating shaft journaled in the housing and extending through opposite walls thereof, crank type handles secured to the opposite ends of said shaft, a gearing mechanism connecting said shaft to the drum and including a manually operated clutch controllable from the exterior of the housing, a variable pressure brake mechanism connected with the drum and operable and adjustable at the will of the operator from the exterior of the housing, and a noise producing adjustable ratchet device associated with the drum and operable from the exterior of the housing at the will of the operator for rendering said ratchet device effective and ineffective.

6. In a fishing device, an elongated tubular housing having its ends detachably connecting hand grips to cooperate therewith in completing a handle for a fishing pole and provided with a line slot, a longitudinal line drum journaled in the housing to receive and let out the line, a transverse operating shaft journaled in the housing and extending through opposite walls thereof, crank type handles secured to the opposite ends of said shaft, a gearing mechanism connecting said shaft to the drum and including a manually operated clutch controllable from the exterior of the housing, a variable pressure brake mechanism connected with the drum and operable and adjustable at the will of the operator from the exterior of the housing, a noise producing adjustable ratchet device associated with the drum and operable from the exterior of the housing at the will of the operator for rendering said ratchet device effective and ineffective, and a finger lever pivoted to the housing and extending therein to engage a part of the drum to apply braking action thereon and operable at will by a person's finger of the hand grasping one of the grips.

7. A fishing device as set forth in claim 4 and further describing the variable pressure brake mechanism more specifically as comprising a radial screw-threaded stem having a brake-shoe at its inner end in contact with the drum and being fitted intermediate is ends with screw-threaded longitudinal adjustment in a longitudinally movable but non-rotative guide block in the housing, a spring interposed between said guide block and said brake-shoe, and a manipulating finger piece on the outer end of the stem.

ANGELO J. FORESTIERE, Sr.